(12) United States Patent
Tauferner

(10) Patent No.: US 9,719,247 B2
(45) Date of Patent: Aug. 1, 2017

(54) REINFORCED WATER-RESISTANT BOARD WITH TRAFFIC COAT

(71) Applicant: Piotr Robert Tauferner, Lindenhurst, NY (US)

(72) Inventor: Piotr Robert Tauferner, Lindenhurst, NY (US)

(*) Notice: Subject to any disclaimer, the term of this patent is extended or adjusted under 35 U.S.C. 154(b) by 0 days.

(21) Appl. No.: 15/044,376

(22) Filed: Feb. 16, 2016

(65) Prior Publication Data

US 2016/0160495 A1 Jun. 9, 2016

Related U.S. Application Data

(62) Division of application No. 14/074,909, filed on Nov. 8, 2013, now Pat. No. 9,267,285.

(51) Int. Cl.
*E04B 1/66* (2006.01)
*B32B 5/02* (2006.01)
(Continued)

(52) U.S. Cl.
CPC ............... *E04B 1/665* (2013.01); *B32B 3/06* (2013.01); *B32B 5/02* (2013.01); *B32B 5/022* (2013.01);
(Continued)

(58) Field of Classification Search
CPC ... E01C 5/00; E01C 5/008; E01C 5/08; E01C 5/20; E01C 9/002; E01C 9/08; E01C 13/04; Y10T 428/2443; E04C 2/528; E04C 2/00; E04C 2/26; E04C 2/246; E04C 2/16; B32B 37/24; B32B 5/30;
B32B 5/16; B32B 3/06; B32B 13/14; B32B 21/10; B32B 5/02; B32B 7/12; B32B 5/022; B32B 2037/243; B32B 2305/18; B32B 2419/00; E04B 1/66
(Continued)

(56) References Cited

U.S. PATENT DOCUMENTS 2,932,596 A 4/1960 Rayner
3,503,831 A 3/1970 Oyama
(Continued)

FOREIGN PATENT DOCUMENTS

CA 1143532 A 3/1983
CA 2 816 461 A1 5/2006
(Continued)

OTHER PUBLICATIONS

European Search Report dated Mar. 12, 2015, issued in EP Application No. 14 19 2116.
(Continued)

*Primary Examiner* — Babajide Demuren
(74) *Attorney, Agent, or Firm* — Carter, DeLuca, Farrell & Schmidt, LLP

(57) ABSTRACT

A reinforced water-resistant board includes a cover board with a reinforced water-resistant membrane applied to a surface of the cover board. The reinforced water-resistant membrane includes a primer layer, a reinforced membrane, a traffic coat, and a sealing layer. The primer layer is applied over the surface of the cover board. The reinforced membrane includes fleece soaked in a liquid resin and is applied over the primer layer. The traffic coat is boned to the reinforced member. The sealing layer is applied over the traffic coat.

20 Claims, 4 Drawing Sheets

(51) Int. Cl.

| | | |
|---|---|---|
| B32B 5/16 | (2006.01) | |
| B32B 5/30 | (2006.01) | |
| B32B 7/12 | (2006.01) | |
| B32B 13/14 | (2006.01) | |
| B32B 21/10 | (2006.01) | |
| B32B 3/06 | (2006.01) | |
| B32B 37/24 | (2006.01) | |
| E04C 2/16 | (2006.01) | |
| E04C 2/24 | (2006.01) | |
| E04C 2/26 | (2006.01) | |
| E04C 2/52 | (2006.01) | |
| E04C 2/00 | (2006.01) | |
| E04C 2/22 | (2006.01) | |
| E04C 2/34 | (2006.01) | |
| E04B 5/02 | (2006.01) | |

(52) U.S. Cl.
CPC ............... *B32B 5/16* (2013.01); *B32B 5/30* (2013.01); *B32B 7/12* (2013.01); *B32B 13/14* (2013.01); *B32B 21/10* (2013.01); *B32B 37/24* (2013.01); *E04B 1/66* (2013.01); *E04C 2/00* (2013.01); *E04C 2/16* (2013.01); *E04C 2/22* (2013.01); *E04C 2/24* (2013.01); *E04C 2/246* (2013.01); *E04C 2/26* (2013.01); *E04C 2/34* (2013.01); *E04C 2/50* (2013.01); *E04C 2/528* (2013.01); *B32B 2037/243* (2013.01); *B32B 2255/02* (2013.01); *B32B 2255/04* (2013.01); *B32B 2255/08* (2013.01); *B32B 2255/26* (2013.01); *B32B 2260/021* (2013.01); *B32B 2260/025* (2013.01); *B32B 2260/046* (2013.01); *B32B 2262/0276* (2013.01); *B32B 2264/102* (2013.01); *B32B 2305/18* (2013.01); *B32B 2305/20* (2013.01); *B32B 2307/712* (2013.01); *B32B 2419/00* (2013.01); *Y10T 428/23914* (2015.04); *Y10T 428/2443* (2015.01)

(58) Field of Classification Search
USPC ..... 52/177, 408, 409, 592.1; 404/31, 35, 44, 404/45; 442/413; 428/537.1
See application file for complete search history.

(56) References Cited

U.S. PATENT DOCUMENTS

| | | |
|---|---|---|
| 3,729,368 A | 4/1973 | Ingham et al. |
| 4,469,731 A | 9/1984 | Saracino |
| 4,492,064 A | 1/1985 | Bynoe |
| 4,706,435 A | 11/1987 | Stewart |
| 4,959,250 A * | 9/1990 | McKinnon ............ B28B 1/005 427/263 |
| 6,516,580 B1 | 2/2003 | Maietta |
| 7,267,735 B2 | 9/2007 | Chang |
| 7,607,271 B2 | 10/2009 | Griffin et al. |
| 7,658,040 B2 | 2/2010 | Bennett et al. |
| 7,718,253 B2 | 5/2010 | Griffin et al. |
| 2002/0100231 A1 | 8/2002 | Miller et al. |
| 2002/0189185 A1 | 12/2002 | Hunter |
| 2003/0054127 A1 | 3/2003 | Heifetz |
| 2003/0129899 A1 | 7/2003 | Fields |
| 2006/0016142 A1 | 1/2006 | Wells |
| 2007/0087166 A1 | 4/2007 | Lee et al. |
| 2008/0245007 A1 | 10/2008 | McDonald |
| 2009/0308001 A1 | 12/2009 | Wu et al. |
| 2010/0068499 A1 | 3/2010 | Kanagawa et al. |
| 2010/0189977 A1 | 7/2010 | Griffin et al. |
| 2011/0131901 A1 | 6/2011 | Pervan et al. |
| 2011/0203218 A1* | 8/2011 | Solov ............... B29C 70/305 52/745.06 |
| 2011/0223410 A1 | 9/2011 | Gencer et al. |
| 2012/0247042 A1 | 10/2012 | Clancy et al. |
| 2014/0099496 A1* | 4/2014 | Attard ............... B32B 5/02 428/221 |
| 2014/0234565 A1 | 8/2014 | Schlueter |
| 2014/0272404 A1 | 9/2014 | Shake et al. |

FOREIGN PATENT DOCUMENTS

| | | |
|---|---|---|
| CN | 202954530 U | 5/2013 |
| CN | 103448122 A | 12/2013 |
| DE | 102011101462 A1 | 11/2011 |
| DE | 202012101988 U1 | 7/2012 |
| WO | 0047401 A1 | 8/2000 |
| WO | 2005072957 A1 | 8/2005 |
| WO | 2012078664 A1 | 6/2012 |

OTHER PUBLICATIONS

European Office Action dated Apr. 15, 2016, issued in EP Application No. 14 192 116.3.

* cited by examiner

REINFORCED WATER-RESISTANT BOARD WITH TRAFFIC COAT

CROSS-REFERENCE TO RELATED APPLICATION

This application is a divisional application of U.S. patent application Ser. No. 14/074,909, filed on Nov. 8, 2013, now U.S. Pat. No. 9,267,285, the entire contents of which is hereby incorporated by reference.

BACKGROUND

1. Technical Field

The present disclosure relates to construction materials and, more specifically, to a construction board with a pre-applied water-resistant coating.

2. Background

Water-resistant describes objects relatively unaffected by water or resisting the ingress of water under specified conditions. "Water resistant" often refers to penetration of liquid water. In construction, a building or structure is made water-resistant with the use of membranes and coatings to protect contents underneath or within as well as protecting structural integrity. Water-resistance is not limited to roofing. Moreover, roofing does not necessarily mean that it is water-resistant.

In commercial, residential, and industrial constructions and buildings, the conventional system of water-resistance involves "membranes." This relies on the application of one or more layers of membrane (available in various materials: e.g., bitumen, silicate, polyvinyl chloride (PVC), ethylene propylene diene monomer (EPDM), etc.) that act as a barrier between the water and the applicable spaces, preventing the passage of water. However, the membrane system relies on exacting application, presenting many difficulties such as problems with application and adherence to the substrate can lead to leakage.

In general, one or more layers of membrane systems are separately manufactured and separately and successively applied to the substrate/surface and applicable penetrations. This requires application as per manufacturer's instructions and specifications, qualified/experienced applicators, and most important for exterior work or roofs, good weather conditions. Once completed, installation of overboard (such as wood decks, pavers, titles, etc.) is required to protect membrane from punctures and allow foot traffic.

SUMMARY

In an aspect of the present disclosure, a reinforced water-resistant board includes a substrate, a primer layer, a reinforced membrane, a traffic coat, and a sealing layer. The primer layer is applied over a surface of the substrate. The reinforced membrane is applied over the primer layer and includes a liquid resin absorbed in fleece. The traffic coat is applied over and bonded to the reinforced membrane. The sealing layer is applied over the traffic coat. In embodiments, the substrate includes a key protruding from a first edge and defines a keyway in a second edge.

In aspects of the present disclosure, a method of manufacturing a reinforced water-resistant board includes forming a reinforced membrane including soaking fleece in a liquid resin, applying the reinforced membrane over the surface of a substrate, and spreading a traffic coat over the reinforced membrane before the liquid resin cures. The method may include applying a primer layer to a surface of a substrate and curing the primer layer. The reinforced membrane may be applied over the cured primer layer. The method may include applying a sealing layer over the traffic coat. In embodiments, the method includes permitting the reinforced membrane to cure before applying a sealing layer over the traffic coat.

In aspects of the present disclosure, applying the reinforced membrane includes spreading the liquid resin over the primer layer and laying the fleece over the liquid resin spread over the primer layer. Applying the reinforced membrane may include rolling the fleece to remove air bubbles from the reinforced membrane. Forming the reinforced membrane may include spreading additional liquid resin over the reinforced membrane over the fleece laid over the liquid resin.

In aspects of the present disclosure, a water-resistant system includes a plurality of reinforced water-resistant boards and a joint sealing system. Each of the plurality of reinforced water-resistant boards may be any of the reinforced water-resistant boards described herein. The joint sealing system is applied over the joints between each of the plurality of reinforced water-resistant boards. The joint sealing system includes a sealing compound placed in each of the joints and a sealing strip laid over each of the joints.

By prefabricating the reinforced water-resistant boards, the application of the water-resistant systems may be simplified. For example, the prefabricated boards may be used without the need for using torches or kettles to heat a water-resistant membrane or material in the field. Moreover, by prefabricating the reinforced water-resistant boards, in a factory within a controlled environment the adhesion of the water-resistant membrane to the substrate may be more consistent and less prone to defects than a water-resistant membrane applied in the field. The prefabricated reinforced water-resistant board may have a longer life cycle and may be universally used in a variety of applications including but not limited to flat roofs, sloped roofs, balconies, patios, basements, exterior walls, interior walls, floors, etc. In addition, the use of prefabricated reinforced water-resistant boards may reduce the amount of time and activities are required to install the boards decreasing the likelihood of accidents and defects during the installation of the water-resistant systems. Further, using prefabricated reinforced water-resistant boards may decrease the delays in installing a water-resistant system due to weather or environmental conditions, e.g., curing times, humidity, sun exposure, etc. The prefabricated reinforced water-resistant boards may also reduce the need for temporary water-resistant system to be installed before the final water-resistant system is available, e.g., temporary roof.

By not requiring the use of an over-material, e.g., shingles, tiles, decking, the water-resistant boards may provide a lighter weight water-resistant solution, which may reduce the needed structural support and/or reduce the risk of structural collapses.

Reducing the amount of time required to install a water-resistant system by using prefabricated reinforced water-resistant boards the labor cost of the installation may be reduced. Moreover, the installation of prefabricated reinforced water-resistant boards may reduce the need for skilled water-proofers and roofers permitting lower skilled laborers to install the water-resistant system.

Certain embodiments of the present disclosure may include some, all, or none of the above advantages. One or more other technical advantages may be readily apparent to those skilled in the art for the figures, descriptions, and claims included herein. Moreover, while specific advantages have been enumerated above, various embodiments may include all, some, or none of the enumerated advantages.

Further, to the extent consistent, any of the aspects described herein may be used in conjunction with any or all of the other aspects described herein.

BRIEF DESCRIPTION OF THE DRAWINGS

Various aspects of the present disclosure are described hereinbelow with reference to the drawings, wherein.

DETAILED DESCRIPTION

Figure 1:
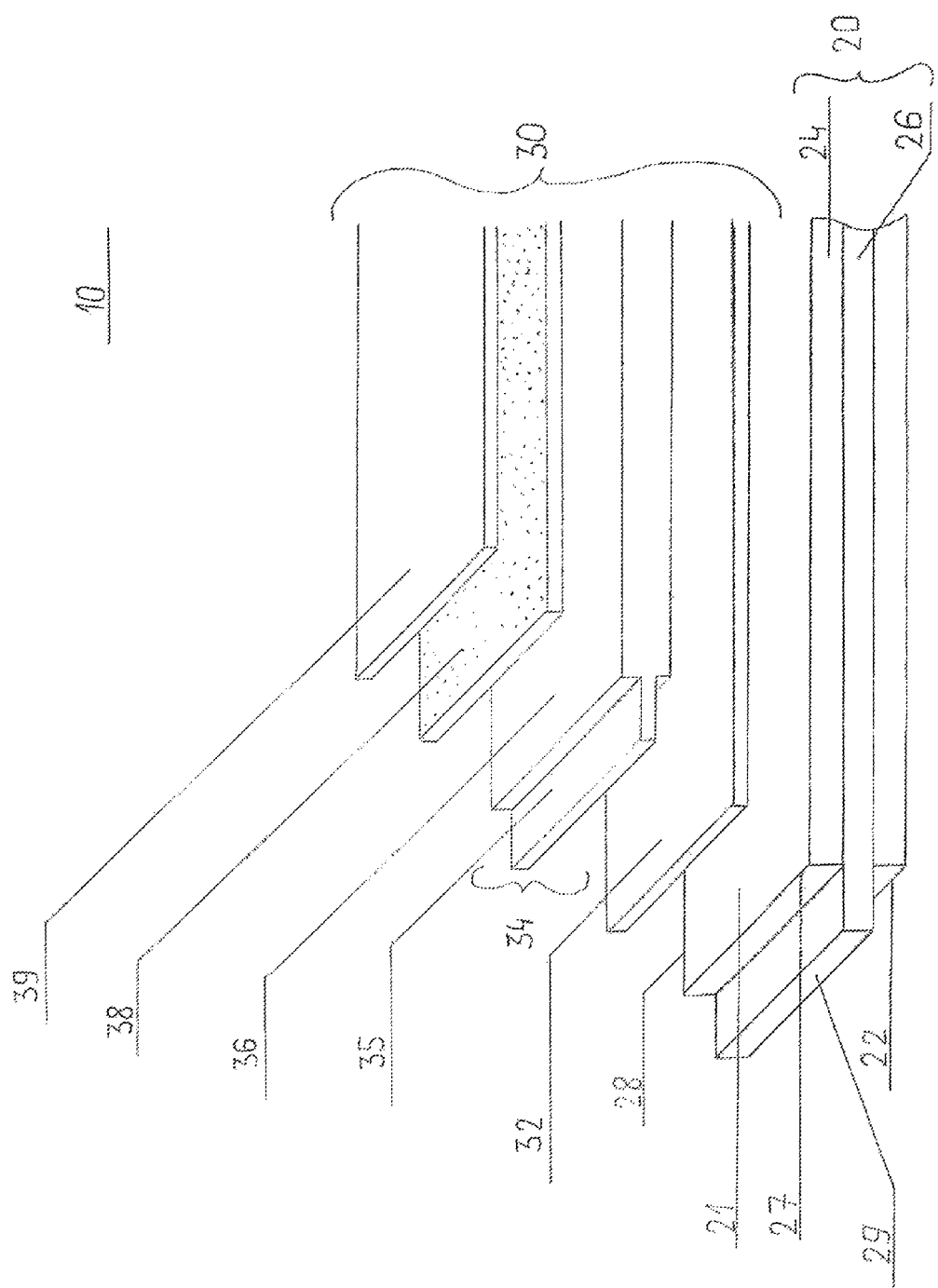
FIG. 1 is an exploded perspective view showing the layers of an exemplary embodiment of a reinforced water-resistant board in accordance with the present disclosure.

Embodiments of the present disclosure are now described in detail with reference to the drawings in which like reference numerals designate identical or corresponding elements in each of the several views.

Referring now to FIG. 1, a reinforced water-resistant board 10 is provided in accordance with the present disclosure including a substrate or cover board 20 and a reinforced water-resistant membrane 30. The reinforced water-resistant membrane 30 includes a primer layer 32, a reinforced membrane 34, a traffic coat 38, and a sealing layer 39.

The reinforced water-resistant board 10 is manufactured by applying the primer layer 32 to a surface 21, 22 of the cover board 20, applying the reinforced membrane 34 over the primer layer 32, applying the traffic coat 38 over the reinforced membrane 34, and applying the sealing layer 39 over the traffic coat 38. As detailed below, the reinforced water-resistant membrane 30 is applied to surface 21 of the cover board 20; however, it is contemplated that the reinforced water-resistant membrane 30 may be applied to both the surface 21 and the surface 22 of the cover board 20. In embodiments, the reinforced water-resistant membrane 30 is applied to surfaces 21 and 22 of the cover board 20 simultaneously. In some embodiments, the reinforced water-resistant membrane 30 is applied to one of the surfaces 21, 22 of the cover board 20 and then to the other one of the surfaces 21, 22 of the cover board 20. Applying the reinforced water-resistant membrane to both of the surfaces 21 and 22 may protect the cover board 20 from moisture penetrating the cover board 20 through either of the surfaces 21, 22.

The cover board 20 may be constructed of any suitable construction material, e.g., a plywood board, a cement board, a blue board, etc. The cover board 20 may be provided in standard construction lengths and widths, e.g., 8'×4', 8'×6', 5'×3', 4'×4', 12'×2', 12'×26", 8'×26", or in customer sizes. The cover board 20 may be provided in varying thickness in a range of about ⅛" to about 2", e.g., ¼", 3/16", ⅜", ½", 5/16", ⅝", ¾", 1". Two edges of the cover board 20, e.g., an edge 24, may include a keyway 26 and two edges 27, 28 of the cover board 20 may include a key 29. The keyway 26 of one cover board 20 is configured to receive the key 29 of another cover board 20 to interlock adjacent cover boards. The key 29 may extend in a range of about ⅛" to about ½" from the edge 27, 28 of the cover board 20. The key 29 may be substantially centered along an edge 27, 28 of the cover board 20 as shown in FIG. 1. In embodiments, the key 29 is positioned adjacent a surface 21, 22 along an edge 27, 28 of the cover board 20.

The primer layer 32 is applied to surface 21 of the cover board 20. The primer layer 32 is permitted to cure after being applied to the surface 21. The primer layer 32 may cure in a range of about 1 hour to about 8 hours, e.g., 1, 1.5, 2, 2.5, 3, 3.5, 4, 5, 6, 7, 8 hours, etc.

The reinforced membrane 34 includes fleece 35 that absorbs a liquid resin 36. The reinforced membrane 34 may be applied by applying the liquid resin 36 over the cured primer layer 32, spreading the fleece 35 over the liquid resin 36, and applying additional liquid resin 36 over the fleece 35. A roller (not shown) may be rolled over the fleece 35 and the liquid resin 36 to remove air bubbles from within the reinforced membrane 34. In embodiments, the reinforced membrane 34 may be applied by soaking the fleece 35 in a liquid resin 36 until the fleece 35 absorbs the liquid resin 36. The soaked fleece 35 is laid over the cured primer layer 32. In some embodiments, the reinforced membrane 34 is applied over the cured primer layer 32 by laying the fleece 35 over the cured primer layer 32 and spreading the liquid resin 36 over the fleece 35 until the fleece 35 absorbs the liquid resin 36. When the soaked fleece 35 cures, the soaked fleece 35 forms the reinforced membrane 34. The soaked fleece 35 may cure in the range of about 1 hour to about 8 hours, e.g., 1, 1.5, 2, 2.5, 3, 3.5, 4, 5, 6, 7, 8 hours, etc.

The traffic coat 38 is spread over the reinforced membrane 34 before the soaked fleece 35 cures. The traffic coat 38 may be dry silica sand or quartz sand spread over the soaked fleece 35. In embodiments, the traffic coat 38 covers the entire surface of the reinforced membrane 34 such that no wet spots of the reinforced membrane 34 are visible. The wet surface of the soaked fleece 35 bonds with the traffic coat 38 as the soaked fleece 35 cures. The traffic coat 38 protects the reinforced membrane 34 from damage. The traffic coat 38 may protect the reinforced membrane 34 from punctures. The traffic coat 38 may allow foot traffic on top of the reinforced member 34 eliminating the need for an over layer such as wood decking, pavers, tiles, shingles, etc.

The sealing layer 39 is applied over the traffic coat 38 after the reinforced membrane 34 cures and bonds with the traffic coat 38. The sealing layer 39 is spread over the traffic coat 38 to prevent liquid penetration into the reinforced membrane 34. The sealing layer 39 is permitted to cure. The sealing layer 39 may cure in the range of about 1 hour to about 4 hours, e.g., 1, 1.5, 2, 2.5, 3, 3.5, 4 hours, etc.

The cover board 20 may include one or more of cement board, plywood, fiberboard, blue board, or composite board. "Cement board" should be understood to include a variety of products including but not limited to one or multi component cement aggregates and reinforcements. "Plywood" should be understood to include a variety of products including but not limited to 1 ply, 3 ply, sanded, unsanded, sheathing, nonsheathing, finished, unfinished, pine, birch, maple, cedar, etc. The following commercially available substrates or cover boards may be used as the cover board 20: WonderBoard® backerboard, Durock® cement board, Project Panels, Hunter panels, Plytanium®, Sopraboard, etc.

The primer layer 32 may include one, two, or multi component epoxy, waterborne epoxy, water-based epoxy, liquid epoxy resins, acrylic, liquid polyurethane resins, liquid methyl methacrylate resin, polymethyl methacrylate (PMMA) primers, thixotropic PMMA resins, catalyzed PMMA primers or coatings, etc. The primer layer 32 may be provided as a liquid. The primer layer 32 may be a cold-applied liquid primer. Suitable primers that may be used to form the primer layer 32 are commercially available from Kemper System, Soprema®, Sika, Behr, Siplast®, SEAL-KRETE®, etc. Exemplary materials may be but are not limited to Sikafloor® FTP, Kempertec® Primer, Kempertec® EP Primer, Kempertec® AC Primer, Kempertec® BSF-R Primer/Sealer, Alsan® RS 222 Primer, Alsan® RS 276 Primer, Siplast® Pro Primer R Resin, Siplast® Pro Primer W Resin, BEHR PREMIUM® Concrete & Masonry Bonding Primer, etc.

The fleece 35 of the reinforced membrane 34 may include one or more polyester layers, cotton layers, fiberglass fabric layers, reinforced or non-reinforced, coated or non-coated, saturated or non-saturated, non-woven, needle-punched, stitch-bonded, heat-set, or cold process spun. Suitable materials that may be used as the fleece 35 are commercially available from Kemper Systems, Soprema®, Siplast®, Sika, etc. Exemplary materials may be but are not limited to Alsan® RS Fleece, Kemperol® Fleece 200, Kemperol® Fleece 165, Kemperol® Fleece AP 120, Siplast® Pro Fleece, Sikalastic® Fleece-120, etc.

The liquid resin 36 of the reinforced membrane 34 may include one or more of polyurethane, catalyzed PMMA, PMMA acrylic resin, aliphatic polyurethane, electrometric polyurethane, siliconized elastomeric acrylic, elastomeric acrylic, ceramic elastomeric, acrylic, acrylic latex, methyl methacrylate, polyester, waterborne resins or coatings, etc. any of which may be one, two, or multi-component, fast or slow curing, aromatic or odorless. The liquid resin 36 may be a cold-applied liquid resin. Suitable liquid resins that may be used as the liquid resin 36 are commercially available from Kemper System, Soprema®, Sika, Behr, Henry, Siplast®, Gardner-Gibson, SEAL-KRETE®, etc. Exemplary materials may be but are not limited to Alsan® RS 230 Field, Kemperol® 2K-PUR, Kemprol® AC, Kemperol® BR, Kemperor® BRM, Kemprol® V210, Kemperol® V210M, Siplast® Parapro Flashing Resin, Siplast® Parapro Roof Membrane Resin, Sikalastic®-560, Sikalastic®-710 Base, Sikalastic®-720 Base, Sikalastic®-745AL, Sikalastic®-715 Top, Black Jack® 5530-1-30 (Ultra-Roof 1000), Black Jack® 5227-1-20 (Roof Patch), Black Jack® 5527-1-30 (Roof-Gard 700), Black Jack® 532-1-30 (Maxx-Cool), Black Jack® 6030-7-20 (Foundation Waterproof Coating), etc.

The traffic coat 38 may be a combination of one or more of resin, fleece, silica sand, and sealer. Suitable sizes for sand used as the traffic coat may be in a range of about −1 to about 4 on the Krumbein Phi Scale. Suitable traffic coats that may be used as the traffic coat 38 are commercially available from Kemper System, Soprema®, Sika, Behr, Henry, Gardner-Gibson, SEAL-KRETE®, Siplast®, etc. Exemplary materials may be but are not limited to Surfacing Sand #0 from Kemper Systems, 3M Colorquart®, etc.

The sealing layer 39 may include one or more of concrete, brick, or roofing sealers including but not limited to polyurethane, aliphatic polyurethane, water-based acrylic, acrylic resin, epoxy, epoxy acrylic, water-based, waterborne, waterborne epoxy, siliconized elastomeric acrylic, elastomeric acrylic, ceramic elastomeric, acrylic latex, methyl methacrylate, silicate, silane siloxane, and polyester sealers or coatings, etc. which may be one, two, or multi component, fast or slow curing, aromatic or odorless, and from glossy to flat finish. The sealing layer 39 may be provided in liquid form. In embodiments, the sealing layer 39 is a cold-applied liquid sealer. Suitable sealers that may be used as the sealing layer 39 are commercially available from Johns Manville, Kemper System, Sika, Behr, Henry, Gardner-Gibson, SEAL-KRETE®, Siplast®, etc. Exemplary materials may be but are not limited to Kemperdur® Eco Finish, Kemperdur® Finish, Kemperdur® Deko Transparent, Kemperdur® FC Floor Coating, Keperdur® EP-FR Finish, Kemperdur® Deko Finish, Kemperdur® BSF-R Finish, Kemperdur® Deko 2KS-FR Finish, Kemperdur® AC Finish, Sikalastic®-745AL, Sikalastic®-715 Top, BEHR PREMIUM® 1 Part Epoxy Concrete Floor Paint, SEAL-KRETE® Original Waterproofing Sealer, SEAL-KRETE® Epoxy Seal Slate Concrete and Garage Floor Paint, Black Jack® 5530-1-30 (Ultra-Roof 1000), Black Jack® 5227-1-20 (Roof Patch), Black Jack® 5527-1-30 (Roof-Gard 700), Black Jack® 5532-1-30 (Maxx-Cool), Black Jack® 6030-7-20 (Foundation Waterproof Coating), etc.

It is contemplated that reinforced membrane 34, the traffic coat 38, and/or the sealing layer 39 may be provided in a variety of colors including but not limited to black, gray, white, brown, silver, etc.

Figure 2:
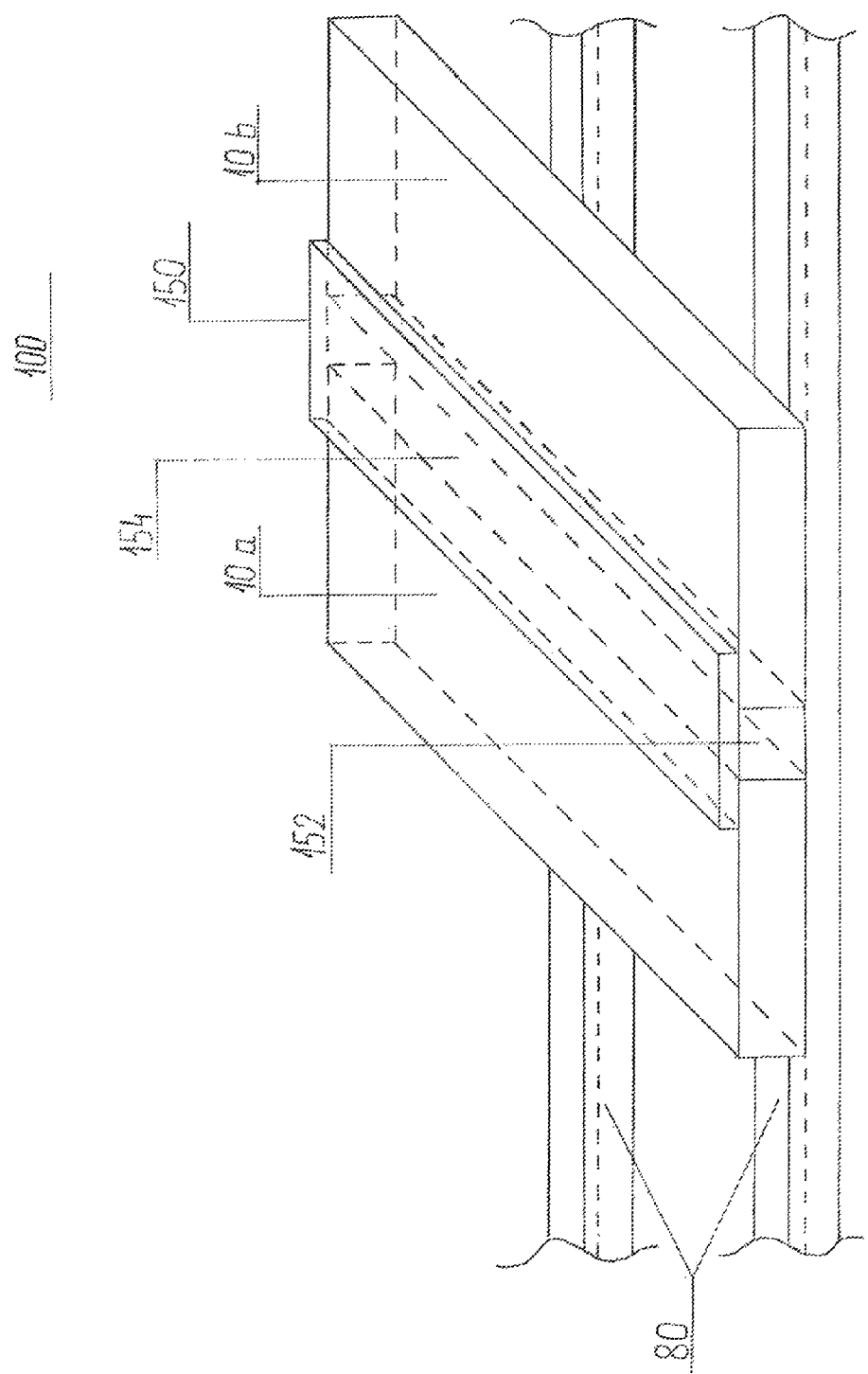
FIG. 2 is a perspective view of an embodiment of a water-resistant system in accordance with the present disclosure including a two reinforced water-resistant boards attached to structural members.
Figure 3:
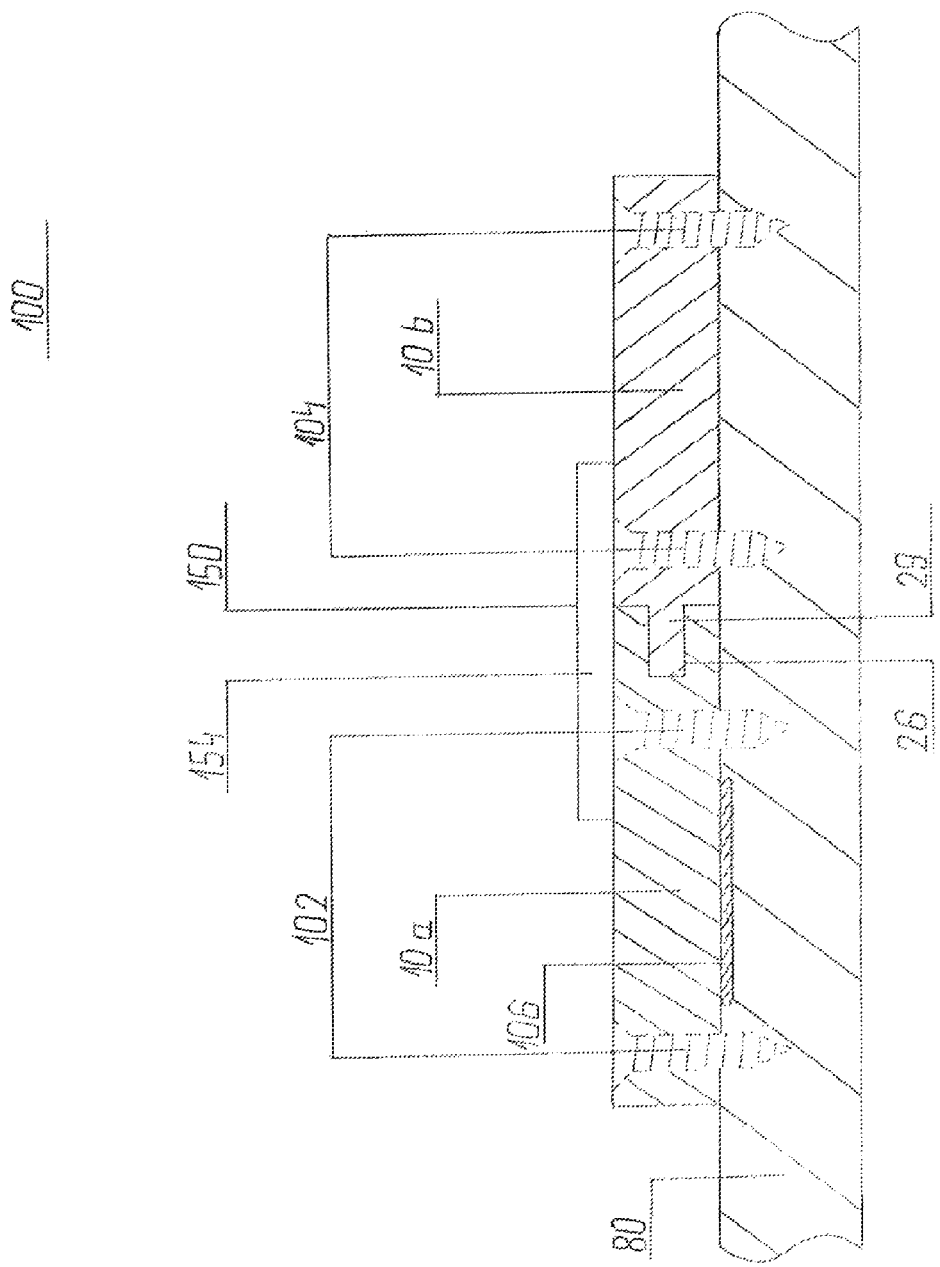
FIG. 3 is a front cross-sectional view of the water-resistant system of FIG. 2 taken along the center line of one of the structural members.
Figure 4:
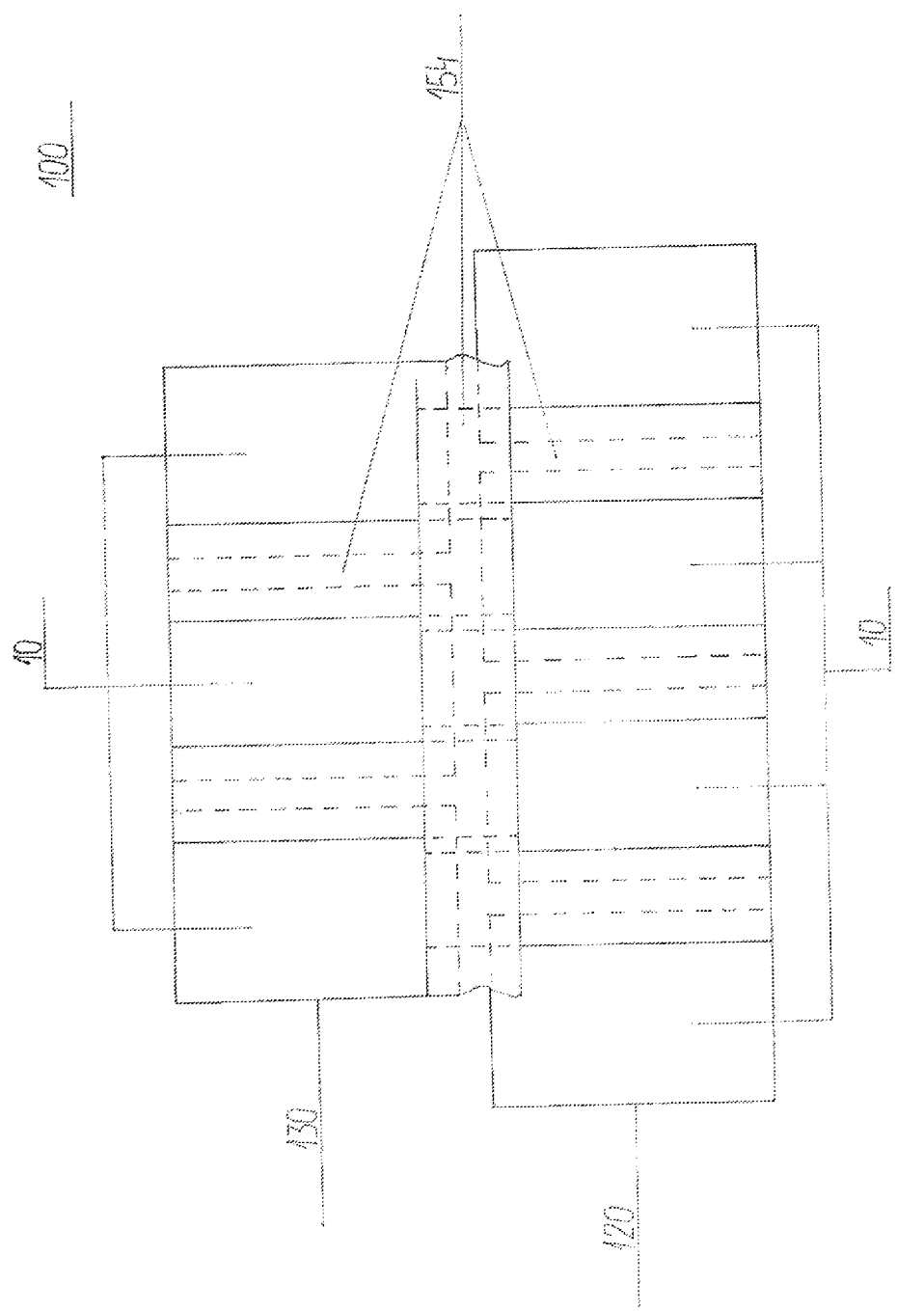
FIG. 4 is a top view of another embodiment of a water-resistant system including a plurality of reinforced water-resistant boards.

With reference to FIGS. 2-4, a water-resistant system 100 in accordance with the present disclosure includes a plurality of reinforced water-resistant boards 10 and a joint sealing system 150. The water-resistant system 100 may be used in a variety of applications including but not limited to new roofs (flat and sloping), roof repair, roof recovery, balconies, terraces, patios, decks, basement finishing, exterior walls, interior walls (e.g., bathrooms, kitchens, laundry rooms, utility rooms, etc.), interior floors, etc.

A first board 10a is attached to one or more structural member(s) 80, e.g., rafters, floor boards, joists, framing, etc, of a structure to be made water-resistant, e.g., a floor, a roof, etc. Each board 10 may be attached to the structural member(s) 80 by one or more fastener(s), e.g., nails 102, screws 104, and/or adhesives 106. As shown in FIG. 3, board 10a is attached to the structural member 80 by a nails 102 and adhesive 106 and board 10b is attached to the structural member 80 by screws 104. The fastener(s) may be driven through the board 10a, 10b and into the structural member 80. A first row of boards 120 is formed by placing a second board 10b adjacent to the first board 10a. Two adjacent boards may be interlocked by inserting a key 29 of the first board 10a into a keyway 25 of the second board 10b. In embodiments, the boards 10 are interlocked by being placed adjacent to one another with a minimum gap between the boards 10a, 10b. The interlocked second board 10b is attached to the structural member(s) 80 in a manner similar to the first board 10a. This process of placing and/or interlocking and attaching boards 10 is continued until the first row of boards 120 is complete. A second row of boards 130 is formed in a similar manner to the first row of boards 120 with the addition of placing and/or interlocking an edge of each board 10 in the second row of boards 130 with an edge of the first row of boards 120. It is also contemplated, that the joints between boards in the second row of boards 130 are offset from the joints between boards in the first row of boards 120 as shown in FIG. 4. Successive rows of boards are added to the water-resistant system 100 until the entire structure is covered by the water-resistant system 100. It is contemplated that portions of boards 10 of the water-resistant system 100 may extend beyond the structural member(s) 80 that the water-resistant is attached. This extension may form an overhang or eave.

The joints between the boards 10 are sealed with the joint sealing system 150. The joint sealing system 150 may include a sealing compound 152 and/or a sealing strip 154. The sealing compound 152 is applied to the joint between the edges of adjacent boards 10a, 10b as shown in FIG. 2. The sealing compound 152 may be a caulking material such as polyurethane caulking, e.g., MP1, Sica, etc. The sealing strip 154 is applied over the joint between two adjacent boards 10a, 10b. The sealing strip 154 may have a width such that the sealing strip 154 covers the top of fasteners, e.g., nails 102, screws 104, driven through adjacent boards 10a, 10b to secure the boards 10a, 10b to the structural member(s) 80. The joint sealing system 150 seals any gaps between adjacent boards 10a, 10b to provide a continuous water-resistant seal across water-resistant system 100. It is contemplated that the sealing strip 34 may be made similar to the reinforced membrane 30 including fleece and liquid resin, e.g., the fleece 35 and the liquid resin 36. In embodiments, the sealing strip 34 is about 4 inches wide; however, the sealing strip 34 maybe thinner or wider than 4 inches. It is understood that the sealing strip 34 is wide enough to cover the joints between adjacent boards and to cover the tops of the fasteners driven through adjacent boards. It is contemplated that sealing strips 34 may cover the entire surface or surfaces of the water-resistant system 100. It is contemplated that the prefabricated reinforced water-resistant boards may be incorporated into existing water-resistant systems already available on the market such as the Kemper System, the Black Jack® System, the Soprema® System, the Siplast® System, etc.

It will be appreciated that the boards 10 of water-resistant system 100 are adjacent and not overlapping that the boards 10 may be laid in any order. For example, a water-resistant system 100 forming a sloped roof may be started by first attaching the boards adjacent to the bottom of the roof, may be started by first attaching the boards forming the peak of the roof, or may be started at any place in the middle of the roof. This allows for flexibility for the construction, which allows areas of the roof to be completed before other portions permitting access to some areas while water-resistant other portions of the structure.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope and spirit of the claims appended hereto.

What is claimed:

1. A method of manufacturing a reinforced water-resistant board comprising:
   forming a reinforced membrane including soaking fleece in a first liquid resin;
   applying the reinforced membrane over a surface of a substrate; and
   spreading sand directly over the reinforced membrane after applying the reinforced membrane over the surface of the substrate before the first liquid resin cures.

2. The method according to claim 1, further comprising applying a primer layer to a surface of a substrate and curing the primer layer, wherein the reinforced membrane is applied over the cured primer layer.

3. The method according to claim 2, wherein applying the reinforced membrane includes spreading the first liquid resin over the primer layer and laying the fleece over the first liquid resin spread over the primer layer.

4. The method according to claim 3, wherein applying the reinforced membrane further includes rolling the fleece to remove air bubbles from the reinforced membrane.

5. The method according to claim 3, wherein forming the reinforced membrane includes spreading a second liquid resin over the fleece laid over the first liquid resin.

6. The method according to claim 1, further comprising applying a sealing layer over the sand.

7. The method according to claim 6, further comprising permitting the reinforced membrane to cure before applying the sealing layer over the sand.

8. The method according to claim 1, wherein at least one of forming the reinforced membrane, applying the reinforced membrane, and spreading the sand is applied by hand.

9. The method according to claim 1, wherein at least one of forming the reinforced membrane, applying the reinforced membrane, and spreading the sand is applied mechanically.

10. A method of manufacturing a water-resistant board comprising:
    applying a primer layer to an outer face of a substrate, the outer face configured to be exposed after installation of the water-resistant board;
    forming a reinforced membrane over the primer layer after the primer layer is applied to the outer face of the substrate; and
    applying sand directly over the reinforced membrane after forming the reinforced membrane.

11. The method according to claim 10, further comprising allowing the primer layer to cure before forming the reinforced membrane over the primer layer.

12. The method according to claim 10, wherein forming the reinforced membrane includes:
    spreading a first liquid resin over the primer layer; and
    laying a fleece in the first liquid resin.

13. The method according to claim 12, wherein forming the reinforced membrane further includes:
    spreading a second liquid resin over the fleece laid in the first liquid resin.

14. The method according to claim 13, wherein spreading the second liquid resin over the fleece laid in the first liquid resin occurs after the first liquid resin with the fleece has cured.

15. The method according to claim 12, wherein spreading the first liquid resin over the primer layer occurs before the primer layer cures.

16. The method according to claim 10, wherein forming the reinforced membrane includes:
    soaking a fleece in a first liquid resin such that the fleece absorbs the first liquid resin; and
    laying a fleece in the primer layer.

17. The method according to claim 10, further comprising applying a sealing layer over the sand.

18. The method according to claim 10, further comprising allowing the reinforced membrane to cure before applying the sand over the reinforced membrane.

19. The method according to claim 10, further comprising:
    applying an inner primer layer to an inner face of a substrate, the inner face opposite the outer face;
    forming an inner reinforced membrane over the inner primer layer.

20. A method of manufacturing a water-resistant board comprising:

soaking a fleece in a first liquid resin such that the fleece absorbs the first liquid resin;

applying the soaked fleece to an outer face of a substrate, the outer face configured to be exposed after installation of the water-resistant board; and applying a traffic coat over the soaked fleece after the soaked fleece is applied to the outer face of the substrate.

\* \* \* \* \*